(12) United States Patent
Jackson

(10) Patent No.: US 8,493,962 B2
(45) Date of Patent: Jul. 23, 2013

(54) METHOD AND DEVICE FOR SELECTING AND TRANSMITTING VARIABLE FRAME FORMATS

(75) Inventor: Timothy Jackson, Great Chesterford (GB)

(73) Assignee: Plextek Limited, Essex (GB)

( * ) Notice: Subject to any disclaimer, the term of this patent is extended or adjusted under 35 U.S.C. 154(b) by 566 days.

(21) Appl. No.: 12/619,010

(22) Filed: Nov. 16, 2009

(65) Prior Publication Data

US 2010/0142464 A1 Jun. 10, 2010

Related U.S. Application Data

(63) Continuation of application No. PCT/EP2008/056079, filed on May 16, 2008.

(30) Foreign Application Priority Data

May 17, 2007 (GB) .................................... 0709592

(51) Int. Cl.
*H04L 12/43* (2006.01)
*H04J 3/16* (2006.01)
*H04J 3/24* (2006.01)
*H04J 3/00* (2006.01)

(52) U.S. Cl.
USPC ........... 370/350; 370/458; 370/470; 370/474; 370/476

(58) Field of Classification Search
USPC .................. 370/278, 282, 350, 458, 470, 474, 370/476
See application file for complete search history.

(56) References Cited

U.S. PATENT DOCUMENTS

| 5,838,672 | A | 11/1998 | Ranta |
| 7,764,664 | B2 * | 7/2010 | Zeng et al. .................... 370/349 |
| 2003/0179778 | A1 | 9/2003 | Guanter et al. |
| 2004/0267993 | A1 | 12/2004 | Spencer et al. |
| 2005/0122898 | A1 * | 6/2005 | Jang et al. .................... 370/218 |
| 2006/0291583 | A1 * | 12/2006 | Hammerschmidt et al. .. 375/295 |
| 2007/0002749 | A1 * | 1/2007 | Sondur et al. ................. 370/238 |

FOREIGN PATENT DOCUMENTS

| EP | 0615352 A1 | 9/1994 |
| EP | 1191730 A1 | 3/2002 |
| EP | 1 737 258 A1 | 12/2006 |
| GB | 2329796 A | 3/1999 |
| WO | 99/56423 A1 | 11/1999 |
| WO | 2007/045081 A1 | 4/2007 |
| WO | 2007/067021 A1 | 6/2007 |

\* cited by examiner

*Primary Examiner* — Michael Thier
*Assistant Examiner* — Redentor Pasia
(74) *Attorney, Agent, or Firm* — BainwoodHuang

(57) ABSTRACT

A network includes a first transceiving station and a further transceiving station. In one arrangement the data is transmitted from the first transceiving station to the second transceiving station according to a frame structure having a payload portion for payload data and a synchronization portion for synchronization data. The frame structure is selected from candidate frame structures having differing durations of the synchronization portion, according to a data loading factor which depends on the amount of data that is required to be transmitted. The payload capacity may be optimised by reducing the duration of the synchronization portion when a large amount of data is required to be transmitted.

23 Claims, 4 Drawing Sheets ment for the outstations to be synchronised with the base station: in relation to the former constraint, if a large volume of data is to be transferred, ideally the frame should have as large a downlink data portion as possible; in relation to the latter constraint, if many of the outstations are unsynchronised, ideally the frame should have as large a synchronisation portion as possible. Thus during periods in which there is a lot of data to be transferred from the base station, the rate of downlink and uplink data transfer may be constrained by the presence of the synchronisation portion. On the other hand, the synchronisation of outstations that are not initially synchronised may be constrained due to the presence of the payload data transfer portions; this may be particularly inefficient during periods of low payload data transfer, in which the full data transfer capacity of the downlink and/or uplink data slots may not be being utilised. Prior art systems typically use a synchronisation portion having a length that provides a compromise between these competing constraints. However, particularly in systems in which the rate of payload data transfer varies greatly, this compromise inevitably leads to inefficiencies, as described above.

METHOD AND DEVICE FOR SELECTING AND TRANSMITTING VARIABLE FRAME FORMATS

BACKGROUND OF THE INVENTION

The present invention relates to a method and apparatus for transmitting data, in particular, but not limited to, data transmission in radio communications systems.

Systems in which data is transmitted between transceiving stations often use a frame structure for transmitting and receiving data. Such systems may comprise a base-station and one or more outstations. The frame structure used for transmitting and receiving data defines portions of time within the frame for specific transmitting/receiving actions. Each frame is typically divided into a predetermined number of slots, with each slot being assigned to a particular purpose; groups of slots may be grouped together so as to divide the frame into portions each having a particular function. One such portion is a synchronisation portion in which synchronisation data is transmitted, typically by the base station. The synchronisation data enables the respective clocks of the base station and the outstation(s) to be synchronised, ensuring that, for example, the transmitting and receiving mechanisms of the respective stations can be correctly coordinated. Communication between the transceiving stations takes place according to a series of such frames.

When an outstation is not synchronised with a base station, it will typically "listen" for synchronisation data in order to achieve synchronisation. It may take several frames for an initially unsynchronised outstation to synchronise with a base station; this is due to the fact that the outstation has to identify the start of the frame from transmissions, and can be particularly time consuming when the transmissions use "frequency hopping". In systems using frequency hopping, data is transmitted between transceiving stations using a radio signal whose frequency varies rapidly, typically changing every slot, according to a predetermined hopping sequence; if a transceiving station becomes unsynchronised, therefore, it attempts to resynchronise by listening at a particular frequency. The next opportunity for resynchronisation therefore occurs the next time the frequency at which the outstation is listening is used by the base station to transmit synchronisation data. If the number of different frequencies in the hopping sequence is large, the time required for resynchronisation may be long.

When an outstation is synchronised with a base station, synchronisation data may be required in order to maintain synchronisation; this is typically required due to the fact that outstations use low-grade clocks (due to e.g. cost considerations) that do not precisely maintain the same time reading as the more accurate clock of the base station. However, only small amounts of synchronisation data are required in order to maintain, as opposed to achieve, synchronisation; a significant part of the synchronisation data transmitted within the synchronisation portion may therefore be redundant from the perspective of outstations which have already achieved synchronisation. This redundant part occupies slots which might otherwise be used for transmitting payload data, as is described below. "Payload data" refers to downlink data and uplink data, which are described below.

Portions of a frame may include downlink data portions, in which data is transmitted from a base station to one or more outstations, and uplink data portions, in which data is transmitted from one or more outstations to a base station; data transmitted within these portions is referred to as "downlink data" and "uplink data" respectively. In many systems, the rate of payload data transfer can vary significantly between transmissions, mainly as a result of balancing an amount of data to be transmitted from the base station with the requirement for the outstations to be synchronised with the base station: in relation to the former constraint, if a large volume of data is to be transferred, ideally the frame should have as large a downlink data portion as possible; in relation to the latter constraint, if many of the outstations are unsynchronised, ideally the frame should have as large a synchronisation portion as possible. Thus during periods in which there is a lot of data to be transferred from the base station, the rate of downlink and uplink data transfer may be constrained by the presence of the synchronisation portion. On the other hand, the synchronisation of outstations that are not initially synchronised may be constrained due to the presence of the payload data transfer portions; this may be particularly inefficient during periods of low payload data transfer, in which the full data transfer capacity of the downlink and/or uplink data slots may not be being utilised. Prior art systems typically use a synchronisation portion having a length that provides a compromise between these competing constraints. However, particularly in systems in which the rate of payload data transfer varies greatly, this compromise inevitably leads to inefficiencies, as described above.

It is an object of the present invention to mitigate at least some of the problems of the prior art.

SUMMARY OF THE INVENTION

In accordance with a first aspect the present invention, there is provided a method of transmitting data in a network, said network comprising a first transceiving station and a further transceiving station, said method comprising:

selecting a frame structure of a frame, wherein said frame structure comprises a synchronisation portion for transmitting synchronisation data; and transmitting data from said first transceiving station to said further transceiving station according to the selected frame structure, in which said selecting comprises selecting a time characteristic of said synchronisation portion according to a data loading parameter.

The invention thus provides a method in which the amount of time allocated to the transmission of synchronisation data in a frame structure can be varied dynamically from frame to frame according to data transfer requirements, in particular based on an amount of data to be transferred, thereby allowing an effective method of allocating sections of time within the frame to various information carrying functions.

In a preferred embodiment, the data loading parameter relates to transmission of payload data. The synchronisation portion may thus be selected according to payload data transfer, or loading, requirements, allowing frame structures to be varied to allow, for example, higher payload data flow during periods of high payload data transfer requirements, and greater amounts of synchronisation data to be transmitted during periods of low payload data transfer requirements, allowing efficient synchronisation of initially unsynchronised base stations.

In a preferred embodiment, the data loading parameter relates to data for transmission from said first transceiving station to said further transceiving station. The data loading parameter may relate to a quantity of data for transmission from said first transceiving station to said further transceiving station within said frame. The method allows the synchronisation portion to be adjusted according to how much data is required to be transmitted within the frame.

Additionally, or alternatively, the data loading parameter relates to data received at said first transceiving station from said further transceiving station. The data loading parameter may relate to data received at said first transceiving station from said further transceiving station within a previously transmitted frame; or to an average amount of data received at said first transceiving station from said further transceiving station within a plurality of preceding frames. These features allow the length of the synchronisation portion to be adjusted according to the amount of data that is expected to be received within the frame.

In some embodiments, the first transceiving station receives data from a plurality of said further transceiving stations, and the data loading parameter relates to an average amount of data received from said plurality of said further transceiving stations. The invention may be implemented in networks comprising a plurality of stations, commonly referred to as outstations, from which data is received, typically at a base station, and the length of the synchronisation portion may be altered based on data flow from a plurality of such stations.

In some preferred embodiments, the frame structure comprises a plurality of slots comprising a synchronisation slot, one of which is a synchronisation slot; the synchronisation slot comprises at least part of said synchronisation portion, thereby providing a convenient method of structuring the frame.

In some arrangements, the number of slots assigned for the purposes of synchronisation is configurable and since each slot is of a predetermined duration, this provides a convenient way of selecting the time characteristic.

In some arrangements, a frame structure is selected from a predetermined plurality of frame structures; the predetermined frame structures may be listed in databases accessible by base stations and outstations, allowing frame structures known to both transmitting and receiving transceiving stations to be selected, facilitating transmission.

In some advantageous arrangements, the frame structure comprises a plurality of data transfer slots, one or more of which may be a transmission slot for transmitting data from a base station to an outstation, a receiving slot for receiving data from an outstation at a base station and/or an acknowledgement slot for transmitting an acknowledgement; the frame structure may be selected by configuring a number of the transmission slots, receiving slots and/or acknowledgement slots. Thus, portions of time within the frame structure related to data transfer may also be adjusted according to data transfer requirements.

In some embodiments, an identifier of a selected frame structure is transmitted; the identifier may be transmitted within said synchronisation portion, providing a convenient means of ensuring that different stations transmit and receive according to the same frame structure.

In some arrangements, the synchronisation data comprises a repeating sequence having two (typically different) elements; these may be arranged into two different repeating sequences. Each synchronisation slot may comprise the two repeating sequences, which may be so-called dot anti-dot sequences, with one of the sequences comprising {0, 1}, and the second of the sequences comprising {1, 0}. The synchronisation portion may comprise a preamble portion. These features provide convenient arrangements for the synchronisation data.

In accordance with a second aspect of the present invention, there is provided a transceiving station for transmitting data, said transceiving station being adapted to transmit data according to a selectable frame structure, said frame structure comprising a synchronisation portion for transmitting synchronisation data, wherein said transceiving station is adapted to select a time characteristic of said synchronisation portion according to a data loading parameter.

In some arrangements, the timing characteristic comprises a ratio of a duration of said synchronisation portion to a duration of said frame, allowing the proportion of the frame time taken up by transmitting synchronisation data to be adjusted in arrangements in which the frame duration is fixed, and in arrangements in which it is variable. In some preferred embodiments, the synchronisation data is for synchronising a timing characteristic of the transceiving station with a timing characteristic of another transceiving station, which may be an outstation. The synchronisation data may be for synchronising transmitting and receiving data.

In accordance with a third aspect of the present invention, there is provided a transceiving station adapted to perform a method according to a first aspect of the present invention.

In accordance with a fourth aspect of the present invention, there is provided a computer program arranged to adapt a transceiving station to perform the method according to a first aspect of the present invention.

Further features and advantages of the invention will become apparent from the following description of preferred embodiments of the invention, given by way of example only, which is made with reference to the accompanying drawings.

DETAILED DESCRIPTION OF THE INVENTION

Figure 1A:
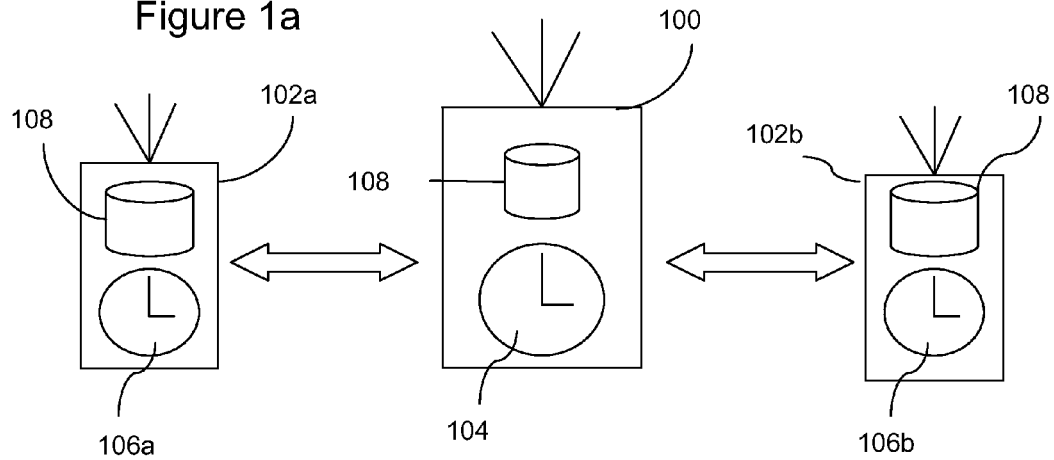
FIG. 1a is a block diagram showing a system comprising a base station, two outstations and connections between them.

FIG. 1a shows a system in which embodiments of the present invention may be implemented. Outstations 102a, 102b communicate with a base station 100. Typically, systems in which embodiments of the present invention are implemented comprise many outstations 102a, 102b and, in some cases, more than one base station; however, only one base station 100 and two outstations 102a, 102b have been represented here for conciseness. The base station 100 comprises a clock 104, which may be locked to UTC time; each of the outstations 102a, 102b also comprises a clock 106a, 106b, each of which may be a real time clock controlled by standard oscillator components. The base station 100 and the outstations 102a, 102b also each have access to a database 108 of frame structures, as is described below.

The outstations 102a, 102b may be metering devices, such as utility meters, and may be arranged to transmit readings of their respective meters to the base station 100, where data is collated, but the invention is not limited to such devices. The base station 100 and the outstations 102a, 102b may transmit and receive data over a radio link. Each of the base station 100 and the outstations 102a, 102b may be capable of duplex communications, with Time Division Duplex (TDD) used to multiplex signals onto a single carrier, though other types of communication between the outstations and the base station are possible. Whilst not essential, in some arrangements (e.g. where the system is used in the USA), the base stations use frequency hopping as mandated by the Federal Bureau of Communications (FCC).

Figure 2A:
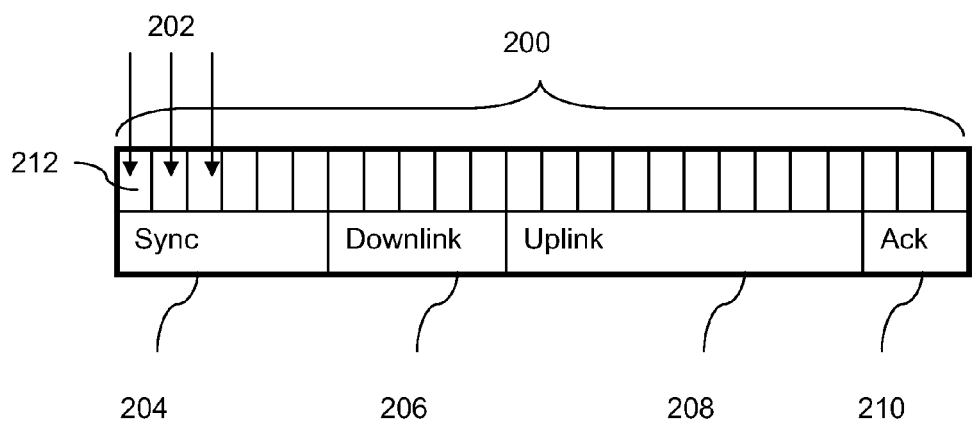
FIG. 2a is schematic diagram of a frame structure comprising a synchronisation portion, a downlink portion, an uplink portion and an acknowledgement portion.

Embodiments of the present invention relate to the transmission and receiving of data according to a frame structure. Components of a system in which embodiments of the present invention may be implemented will now be described. FIG. 2a shows an example frame 200, which is divided into a plurality of time slots 202; for conciseness, only three of the time slots have been labelled, but references to time slots in the following discussion are not limited only to those labelled. The frame 200 shown is structured into four different portions, each of which comprises a number of time slots 202: a synchronisation portion 204, which is for transmitting synchronisation data, as is described in detail below; a downlink portion 206 which is for transmitting data from the base station 100 to one or more of the outstations 102a, 102b; an uplink portion 208, which is for transmitting data from one or more of the outstations 102a, 102b to the base station 100; and an acknowledgement portion 210, which is for transmitting acknowledgements of receipt of data transmitted in the uplink portion. Slots that are occupied by a synchronisation portion, a downlink portion, an uplink portion or an acknowledgement portion will be referred to in the following discussion as synchronisation slots, downlink slots, uplink slots and acknowledgement slots respectively.

The data transmitted within the downlink portion 206 may include control data, or information such as time and date. The data transmitted within the uplink portion 208 may include data relating to readings taken by the outstations 102a, 102b, or notifications of event occurrence at the outstations 102a, 102b.

It will be appreciated that the nature and order of the portions may be altered without departing from the scope of the present invention; in some cases, for example, the acknowledgement portion 210 may not be required. Furthermore, although in the present example, each portion comprises a contiguous sequence of slots, in some cases a given portion may be distributed throughout the frame; for example, the synchronisation portion 204 may comprise slots separated by one or more downlink portion 206 or other slots. In the present example, the synchronisation portion 204 comprises a contiguous sequence of slots at the beginning of each frame; such portions are usually referred to as "preambles". However, the invention is not limited in scope to arrangements in which the synchronisation portion 204 comprises a preamble.

Figure 2B:
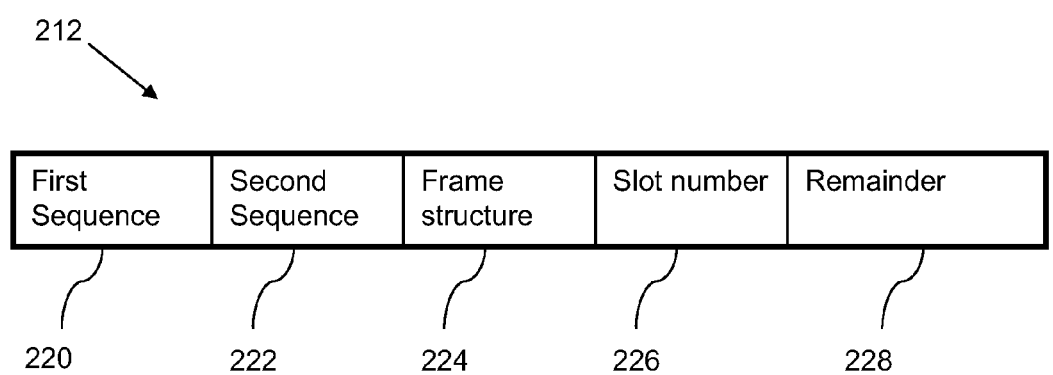
FIG. 2b is schematic diagram of a synchronisation data slot comprising a first sequence portion, a second sequence portion, a frame structure portion, a slot number portion and a remainder portion.

An example structure of a synchronisation portion 204 will now be described with reference to FIG. 2b, which shows the structure of the first time slot 212 of the synchronisation portion 204 of the frame 200. The slot 212 comprises portions for a first sequence 220, a second sequence 222, an identifier of a frame structure 224, an identifier of a slot number 226 and a remainder 228. The first sequence 220 and second sequence 222 are used for the purposes of synchronisation and typically comprise repeating sequences; they may contain a pattern that repeats within the sequence. In one example arrangement, the first sequence 220 comprises a so-called dotting sequence {0, 1, 0, 1 . . . } and the second sequence 222 comprises a so-called anti-dotting sequence {1, 0, 1, 0 . . . }. The second sequence may comprise a different number of repetitions to the first sequence. In a preferred arrangement, the first sequence 220 comprises 24 pairs of dotting, and the second sequence 222 comprises 8 pairs of anti-dotting.

The frame structure identifier 224 comprises data identifying the structure of the frame structure 200 in which it is contained; the significance of this is explained below. The slot number identifier 226 indicates the position of the current slot 212 in the sequence of time slots 202 of the current frame 200, so that the slot position is communicated to the outstations. The remainder 228 comprises, for example, payload and error detection portions and a "guard period" within which no useful data is transmitted, allowing time for, for example, radio retuning (if frequency hopping is being used). Each of the slots in the frame 200 occupied by the synchronisation portion 204 has the structure shown in FIG. 2b; the data transmitted in each of these slots is typically identical, excepting that the slot number identifier 226 iterates for each succeeding slot.

These sequences 220, 222 are typically transmitted by the base station 100, though in some cases they may be transmitted by one or more of the outstations 102a, 102b, perhaps to other outstations. In sequences 220, 222 transmitted by the base station 100, each of the outstations 102a, 102b listens for and locks-on to a sequence. Once locked-on, the transition between the first sequence 220 and the second sequence 222 can be detected, and the point of transition used to synchronise the outstation clocks 106a, 106b with the base station clock 104; this ensures that data transmission and reception within the downlink portion 206 and uplink portion 208 between the base station 100 and the outstations 106a is correctly synchronised.

Figure 3:
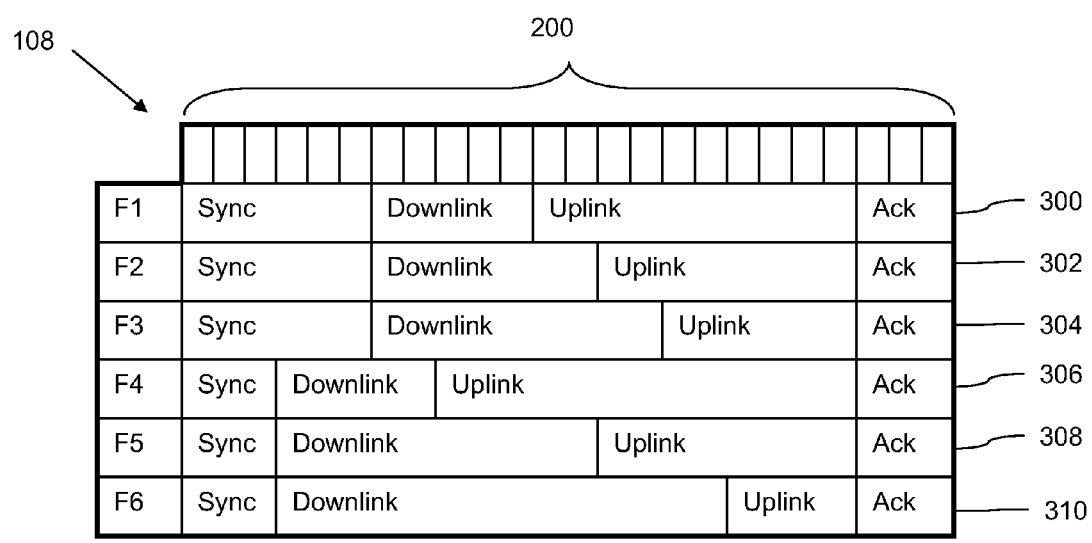
FIG. 3 is a schematic diagram of a database containing a list of frame structures.

As mentioned above, the frame structure for each frame is typically determined by the base station 100. An example embodiment of the present invention, in which a frame structure for a frame is selected from a predetermined list of frame structures, will now be described. FIG. 3 shows an example schematic representation of a database 108 of frame structures, the database being contained within, or accessible by, each of the outstations 102a, 102b and the base station 100 as described above. The database 108 contains six alternative frame structures 300 . . . 310, each comprising a synchronisation portion, a downlink portion, an uplink portion and an acknowledgement portion. In the example database 108 shown, all frame structures have the same total length; however, in some cases, the lengths of the frame structures may be different. It should be noted that the term "length" used herein with reference to frame structures refers to a time length (i.e. a duration).

Each of the frame structures 300 . . . 310 has an associated frame structure identifier F1 . . . F6. The length of the synchronisation portion, the downlink portion and the uplink portion vary according to frame structure, allowing for greater or lesser amounts of the corresponding type of data to be transferred within the frame in question. These lengths are varied according to the number of slots assigned to the respective portion. Whilst in the present example, the length of the acknowledgement portion does not vary according to frame structure, this length can also vary. The database 108 is structured so that frame structures 300 . . . 304 having a relatively long synchronisation portion are listed before frame structures 306 . . . 310 having a relatively short synchronisation portion. The reason for this is explained below.

In embodiments in which frequency hopping is used, the frequency of transmission/reception changes rapidly according to a predetermined hop sequence; typically the frequency changes at the start of each slot. The number of frequencies in the hop sequence is usually different to the number of slots per frame; thus, the frequency of a given slot (e.g. the first slot) in a given frame will typically be different to the frequency of the corresponding slot in adjacent frames. When an outstation loses connectivity with the base station 100, or when attempting to connect for the first time, it attempts to synchronise with the base station 100 by listening at a constant frequency for synchronisation data. Since, and because of the frequency hopping, the frequency at which synchronisation data is broadcast is different for each synchronisation slot for a given frame, the greater the number of synchronisation slots in a frame, the greater the probability of the outstation being tuned to one of the frequencies at which synchronisation data can be received, and thereby synchronise with the base station 100.

When an outstation is connected to the base station 100, it requires a small number of synchronisation slots in order to maintain synchronisation; outstations clocks 106a, 106b are typically low-grade, which, in the absence of synchronisation data, results in the time readings of the outstation clocks 106a, 106b gradually becoming unsynchronised with those of the base station clock 104. However, the number of synchronisation slots required for maintaining synchronisation is typically small, perhaps only one per frame. Particularly when there is a high rate of downlink and/or uplink data transfer, having a large number of synchronisation slots is therefore unnecessary from the perspective of connected outstations, and inhibits the rate of downlink and/or uplink data transfer. Accordingly, embodiments of the present invention provide a method of and apparatus for selecting a frame structure, in particular selecting a synchronisation portion length, in accordance with data transfer requirements.

For each frame, the base station 100 is arranged to select a frame structure from the database 108 according to one or more data transfer parameters, as described below. A frame structure identifier is included in the data transmitted in each slot assigned to a synchronisation portion, as described above. On receipt of a frame structure identifier, each of the outstations 102a, 102b uses the identifier to identify the corresponding frame structure in its database 108, as described below. The outstation can then arrange to receive and transmit data according to the same frame structure as selected by the base station 100.

Figure 1B:
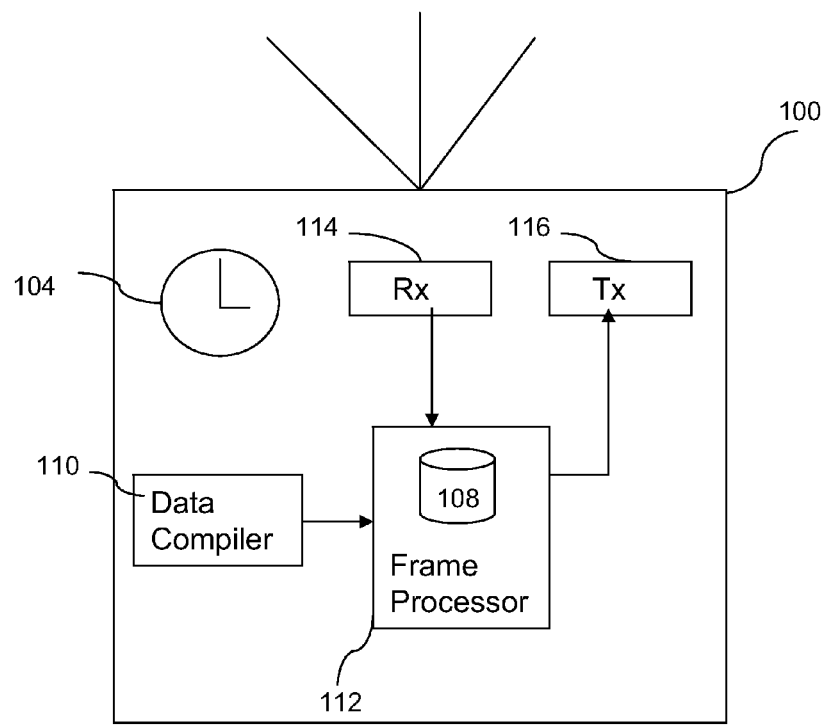
FIG. 1b is a schematic diagram showing a base station and components thereof, including a clock, a data compiler, a frame processor including a database, a receiver and a transceiver.

FIG. 1b is a detailed diagram of a base station 100 in accordance with embodiments of the present invention. The base station 100 comprises a clock 104, a receiver 114, a transmitter 116, a data compiler 110 and a frame determiner 112 containing a database 108. Data is received from the outstations via the receiver 114, and data is transmitted to the outstations via the transmitter 116. The data compiler 110 assigns data for transmission from the transmitter 116 within a given frame; this data is then communicated to the frame processor 112. The frame processor 112 also receives and stores downlink data from the receiver 114. The frame processor 112 uses the data it has received from the receiver 114 and the data compiler to select a frame structure from the database 108 and transmit data according to the selected frame structure, via the transmitter 116.

In one embodiment, some or all of the individual components of the base station 100 represented in FIG. 1b may be individual hardware components; in other embodiments, some or all of the components may be software components running on a processor of the base station 100.

Figure 4:
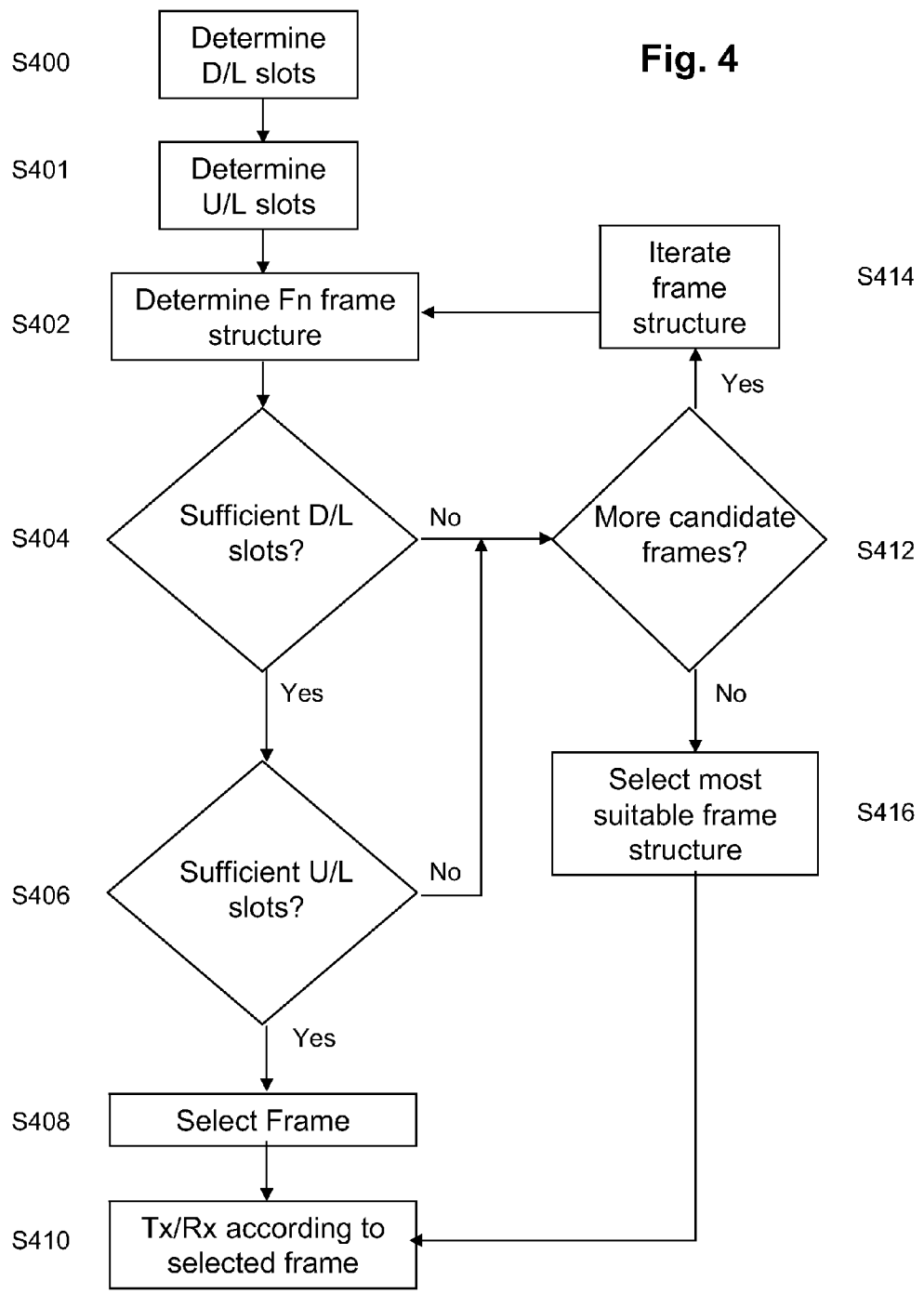
FIG. 4 is a flow diagram showing the operation of base station in selecting a frame structure and transmitting according to that frame structure.

An example of the steps involved in selecting a frame structure for a given frame will now be described with reference to FIG. 4. At step S400, the frame processor 112 determines the number of downlink data slots required for the frame, based on data received from the data compiler 110; this determination may involve dividing the total amount of data (i.e. the total number of bits) received from the data compiler 110 by the data capacity of one downlink slot (i.e. the number of bits of one downlink slot). At step S401, the number of uplink data slots required is determined, based on an average amount of uplink data received via the receiver 114 over a predetermined number of preceding frames. This may involve storing a value representing an amount of uplink data received for each frame, and calculating an average value from the stored values for one or more preceding frames. In most systems, the rate of variation of uplink data transfer is slow enough that a current transfer rate may be accurately estimated based on an immediately preceding transfer rate; calculating an average amounts of uplink data received within preceding frames therefore provides a reliable estimate of the amount of uplink data that will be received in a given frame.

After the uplink and downlink data slot requirements have been determined, the frame processor 112 attempts to match these requirements with a frame structure of the database 108. This is done according to an iterative process, as is now described. At step S402, the frame processor determines the frame structure of a candidate frame structure of the database 108; in the first iteration, the frame processor 112 therefore determines the frame structure of the first frame structure 300 listed in the database 108. In particular, the number of slots assigned to the downlink and uplink portions respectively is determined. At step S404, the frame processor 112 determines whether the number of slots in the downlink portion of the first frame structure 300 conforms to the required number of downlink data slots determined in step S400, that is, whether the number of slots in the downlink data portion of the first frame structure 300 is equal to or greater than the number of slots determined in step S400. If the determination at step S404 is that the number of downlink data slots in the first frame structure 300 is sufficient, then the frame processor 112 proceeds to step S406, where it is similarly determined whether the number of slots in the uplink portion of the current first frame structure is sufficient to conform to the required number of uplink data slots calculated in step S401.

If the determination at step S406 is that the number of uplink data slots in the first candidate frame 300 is sufficient, then the frame processor 112 proceeds to step S408, where the first candidate frame structure 300 is selected as the frame structure for transmission. The base station 100 then transmits and receives data according to the selected frame structure at step S410; this step includes transmitting an identifier of the frame structure selected at step S408 in each of the slots in the synchronisation portion of the selected frame structure.

However, if the determination at either step S404 or step S406 is that the number of downlink data slots or uplink data slots respectively in the first candidate frame 300 is not sufficient, the frame processor 112 proceeds to step S412, where it is determined whether there are any frame structures in the database 108 which have not been evaluated as candidate frame structures for the given frame; that is, it is determined whether the last candidate frame whose frame structure was determined at step S402 is the final frame structure 310 listed in the database 108. If it is determined that there are more frame structures that have not yet been evaluated as candidate frame structures, then the frame processor 112 iterates to the next frame structure listed in the database 108 at step S414, and determines and evaluates this frame structure at step S402 and succeeding steps, as described above. The frame processor 112 thus iterates through the list of frame structures 300 . . . 310 in the database 108 until a frame structure is found that conforms to the required number of downlink and uplink data slots, as determined at steps S400 and S401 respectively.

It is possible that none of the frame structures 300 listed in the database 108 has the required number of uplink and/or downlink data slots. In this case the frame processor 112 proceeds to step S416 where a most suitable frame structure is selected. This may involve selecting a default frame structure, or a frame structure that matches one but not both of the uplink and downlink data slot requirements. The frame processor then proceeds to step S410, where it transmits and receives data according to the frame structure selected at step S416.

As mentioned above, the frame structures 300 . . . 310 are ordered such that the frame structures 300 . . . 304 having a relatively long synchronisation portion are listed before the frame structures 306 . . . 310 having a relatively short synchronisation portion; since the frame processor 112 iterates through the frame structures 300 . . . 310 of the database and selects the first frame structure that meets the data transfer requirements; in cases where there is a frame structure that both has a long synchronisation portion and conforms to the data transfer requirements, this frame structure is selected, allowing any outstations that have lost connectivity a high probability of synchronising with the base station. On the other hand, if the downlink and/or uplink data transfer requirements cannot be satisfied by a frame structure with a long synchronisation portion, a frame structure having a short synchronisation portion is selected, ensuring that data transfer is not inhibited. The length of the synchronisation portion is thus selected in accordance with data flow requirements for each frame, resulting in a dynamically selected synchronisation portion length and frame structure.

The above embodiments are to be understood as illustrative examples of the invention. Further embodiments of the invention are envisaged. For example, in the above description the length of a given portion was varied according to data transfer requirements. However, in some cases, the proportion of a frame structure occupied the given portion may be varied by keeping the given portion length constant and varying the total length of the frame; in some other cases, both the length of the given portion and the length of the frame may be varied. Further, the example database 108 contained six frame structures; however, the scope of the invention extends to databases containing any number of frame structures. Similarly, although the frame structures 300 . . . 310 contained in the database 108 all have one of two synchronisation portion lengths, it is understood that any number of different synchronisation portion lengths may be present without departing from the scope of the invention.

Whilst in the examples given above the frame structure was selected based on both uplink and downlink data transfer requirements, frame structures may be selected based on only one, and not the other, of these. Further, frame structures can be selected based on other alternative or additional data transfer requirements, such as acknowledgement transmission requirements.

The outstations described above need not be metering devices; other devices such as units for controlling and monitoring street lights, devices for horticultural control and monitoring, vending machines, military assets, wireless LANs, mobile phones and military radio systems may be used instead.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of transmitting data in a network, said network comprising a first transceiving station and a further transceiving station, said method comprising transmitting data in a sequence of frames, and for each frame of the sequence of frames:
   selecting a frame structure of a frame, wherein said frame structure comprises a synchronization portion for transmitting synchronization data and one or more further portions for transmitting and/or receiving data different from said synchronization data; and
   transmitting data from said first transceiving station to said further transceiving station according to the selected frame structure,
   in which said selecting comprises:
   selecting a first frame structure for a first frame of said sequence of frames, the first frame structure having a first synchronization portion of a first length; and
   selecting a second frame structure for a second frame of said sequence of frames, the second frame structure having a synchronization portion of a second length,
   the first and second frame structures being selected according to an amount of data to be transmitted and/or received within said one or more further portions of said first and second frames, respectively,
   such that:
      if the amount of data to be transmitted and/or received within said one or more further portions of the first frame is smaller than the amount of data to be transmitted and/or received within the one or more further portions of the second frame, then said first length is selected to be longer than said second length; and
      if the amount of data to be transmitted and/or received within said one or more further portions of the first frame is larger than the amount of data to be transmitted and/or received within the one or more further portions of the second frame, then said first length is selected to be shorter than said second length.

2. A method according to claim 1, in which at least one of the first and second frame structures is selected according to an amount of payload data to be transmitted.

3. A method according to claim 1, in which at least one of the first and second frame structures is selected according to an amount of data to be transmitted from said first transceiving station to said further transceiving station.

4. A method according to claim 1, in which at least one of the first and second frame structures is selected according to a quantity of data to be transmitted from said first transceiving station to said further transceiving station within a respective frame.

5. A method according to claim 1, in which at least one of said first and second frame structures is selected according to an amount of data to be received at said first transceiving station from said further transceiving station in said first and second frames, respectively.

6. A method according to claim 1, in which at least one of the first and second frame structures is selected according to an amount of data received at said first transceiving station from said further transceiving station within a previously transmitted frame.

7. A method according to claim 1, in which at least one of the first and second frame structures is selected according to an average amount of data received at said first transceiving station from said further transceiving station within a plurality of preceding frames.

8. A method according to claim 1, in which said first transceiving station receives data from a plurality of said further transceiving stations, and at least one of said first frame structure and said second frame structure is selected according to an average amount of data received from said plurality of said further transceiving stations.

9. A method according to claim 1, in which said frame structure comprises a plurality of slots comprising a synchronization slot, in which said synchronization slot comprises at least part of said synchronization portion.

10. A method according to claim 9, including selecting a configurable number of synchronization slots, whereby to select said time characteristic of said synchronization portion.

11. A method according to claim 9, in which said synchronization data comprises two repeating sequences, the second of said two repeating sequences being different to the first of said two repeating sequences, and wherein said synchronization slot comprises said two repeating sequences, each of said two repeating sequences comprises two elements, and each of the two elements is different to the other of the two elements.

12. A method according to claim 1, comprising selecting the first and second frame structures from a predetermined plurality of frame structures.

13. A method according to claim 12, in which at least one of said first and second frame structures comprises a plurality of data transfer slots comprising a transmission slot for transmitting data from said first transceiving station to said further transceiving station and the method comprises selecting a configurable number of transmission slots, whereby to select a frame structure from said predetermined plurality of frame structures.

14. A method according to claim 13, in which said plurality of data transfer slots comprises a receiving slot for receiving data from said further transceiving station at said first transceiving station and the method comprises selecting a configurable number of receiving slots, whereby to select a frame structure from said predetermined plurality of frame structures.

15. A method according to claim 13, in which said plurality of further slots comprises an acknowledgement slot for transmitting an acknowledgement and the method comprises selecting a configurable number of acknowledgement slots, whereby to select a frame structure from said predetermined plurality of frame structures.

16. A method according to claim 1, comprising transmitting an identifier of a selected frame structure.

17. A method according to claim 16, comprising transmitting said identifier within said synchronization portion.

18. A transceiving station adapted to perform the method of claim 1.

19. A transceiving station for transmitting data, said transceiving station being configured to transmit data in a sequence of frames according to a selectable frame structure, said frame structure comprising a synchronization portion for transmitting synchronization data and one or more further portions for transmitting and/or receiving data different from said synchronization data, wherein said transceiving station is configured to:
    select a first frame structure for a first frame of said sequence of frames, the first frame structure having a first synchronization portion of a first length; and
    select a second frame structure for a second frame of said sequence of frames, the second frame structure having a synchronization portion of a second length,
    the first and second frame structure being selected according to an amount of data to be transmitted and/or received within said one or more further portions of said first and second frames respectively, such that:
    if the amount of data to be transmitted and/or received within said one or more further portions of the first frame is smaller than the amount of data to be transmitted and/or received within the one or more further portions of the second frame, then said first length is selected to be longer than said second length; and
    if the amount of data to be transmitted and/or received within said one or more further portions of the first frame is larger than the amount of data to be transmitted and/or received within the one or more further portions of the second frame, then said first length is selected to be shorter than said second length.

20. A transceiving station according to claim 19, wherein said synchronization data is for synchronising a timing characteristic of said transceiving station with a timing characteristic of a further transceiving station.

21. A transceiving station according to claim 19, wherein said time characteristic comprises a ratio of a duration of said synchronization portion to a duration of said frame.

22. A transceiving station according to claim 19, wherein said frame has a predetermined duration and said time characteristic comprises a duration.

23. A computer program product comprising a non-transitory computer-readable storage medium having computer readable instructions stored thereon, the computer readable instructions being executable by a computerized device to cause the computerized device to perform a method for transmitting data in a network, said network comprising a first transceiving station and a further transceiving station, said method comprising said method comprising transmitting data in a sequence of frames, and for each frame of the sequence of frames:
    selecting a frame structure of a frame, wherein said frame structure comprises a synchronization portion for transmitting synchronization data and one or more further portions for transmitting and/or receiving data different from said synchronization data; and
    transmitting data from said first transceiving station to said further transceiving station according to the selected frame structure,
    in which said selecting comprises:
    selecting a first frame structure for a first frame of said sequence of frames, the first frame structure having a first synchronization portion of a first length; and
    selecting a second frame structure for a second frame of said sequence of frames, the second frame structure having a synchronization portion of a second length,
    the first and second frame structures being selected according to an amount of data to be transmitted and/or received within said one or more further portions of said first and second frames respectively, such that:
    if the amount of data to be transmitted and/or received within said one or more further portions of the first frame is smaller than the amount of data to be transmitted and/or received within the one or more further portions of the second frame, then said first frame is selected to be longer than said second length; and
    if the amount of data to be transmitted and/or received within said one or more further portions of the first frame is larger than the amount of data to be transmitted and/or received within the one or more further portions of the second frame, then said first length is selected to be longer than said second length.

* * * * *